(12) United States Patent
Daniels et al.

(10) Patent No.: US 6,447,831 B1
(45) Date of Patent: Sep. 10, 2002

(54) FOOD PRODUCT

(75) Inventors: Stephen Charles Daniels, Kempten (DE); Ian Timothy Norton, Sharnbrook (GB); Edward G Pelan, Vlaardingen (NL); Andrea Williams, Sharnbrook (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/631,209

(22) Filed: Aug. 2, 2000

(30) Foreign Application Priority Data

Aug. 4, 1999 (EP) .............................................. 99306185

(51) Int. Cl.$^7$ ................................................. A23D 7/00
(52) U.S. Cl. ...................................... 426/604; 426/613
(58) Field of Search ................................. 426/601, 603, 426/604, 613

(56) References Cited

U.S. PATENT DOCUMENTS

| | | |
|---|---|---|
| 4,273,795 A | 6/1981 | Bosco et al. |
| 4,443,487 A | 4/1984 | Darling |

FOREIGN PATENT DOCUMENTS

| | | |
|---|---|---|
| EP | 0 422 714 | 4/1991 |
| EP | 0 445 849 | 9/1991 |
| EP | 0 463 688 | 1/1992 |
| EP | 0 483 896 | 5/1992 |
| WO | 97/04660 | 2/1997 |

OTHER PUBLICATIONS

Colloids and Surfaces A: Physiochemical and Engineering Aspects, 81 (1993), pp. 139–151, Partial coalescense in oil–in–water emulsions 2. Influence of the properties of the fat.

European Search Report dated Jan. 14, 2000.

Effects of Carnauba Wax Addition on Physical States of Palm Kernel Oil–in–Water Emulsions, Matsumua et al., Bioscience, Biotechnology, and Biochemistry, vol. 59, No. 9, 1995, pp. 1688–1693.

Primary Examiner—Carolyn Paden
(74) Attorney, Agent, or Firm—Gerard J. McGowan, Jr.

(57) ABSTRACT

Firm food products that are suitable for cold use as a spreadable product and for hot use as a frying medium, can be obtained if the products comprise 20 to 80 wt % fat, whereby the fat is present as a clumped fat network. A hydrophilic emulsifier is also present. These products do not show severe spattering when used as a frying medium and are preferably high temperature ambient stable (at temperatures greater than or equal to 25° C.).

17 Claims, 1 Drawing Sheet clumping clustering

FOOD PRODUCT

The invention relates to food products, in particular to spreadable food products that are especially suitable for cold use and in frying. Furthermore food products according to the invention are especially suitable if high temperature (greater than or equal to 25° C.) ambient stable products are desired.

BACKGROUND OF THE INVENTION

Spreadable food products such as margarine are often used both in cold use as a spread for example on bread and in hot use, for example as a shallow frying medium. These products usually comprise an aqueous phase and a fatty phase.

These products preferably fulfil several characteristics. For example if used as a paste or sandwich spread on bread or toast, these products are preferably spreadable; i.e. they can be applied onto bread at room temperature without tearing the bread. Such products are for example disclosed in WO 97/04660. Examples of spreadable products are margarine and margarine like products.

Furthermore these products are preferably of sufficient hardness, such that a part can easily be taken out of a tub or cut from a wrapper product.

The mouthfeel of these products is considered an important attribute. It is generally desired that in cold use, these products easily melt in the mouth. Preferably the products do not impart a sticky impression. According to another preference these products easily release flavour components when consumed.

The aqueous phase ingredients may for example contribute to flavour release.

If the products are used in shallow frying they preferably do not show spattering. Spattering of a common frying medium, such as a water in oil emulsion, is believed to be caused by superheating of water droplets. At a certain point after heating the frying medium said water droplets explosively evaporate, whereby oil can be spread all over the surroundings of a frying pan wherein the emulsion is heated. This may cause danger to the person who intends to fry foodstuff in the heated emulsion.

Another disadvantage of frying products that is often encountered is residue formation. Brown or black residue may be formed when for example biopolymers such as proteins are heated in a frying pan. Preferred products show little or no residue formation when used as a frying agent.

There is a desire for products that show good functionality both when applied as a spread for cold use, and when used as a frying fat. Moreover there is a desire for such products that are also stable (i.e. showing no or a least reduced syneresis) at temperatures from ambient temperature (25° C.) and above, up to around 50° C. U.S. Pat. No. 4,273,795 aims at low fat products with enhanced flavour, which products remain solid and easily spreadable at all temperatures within the range from 32 to 74 F. (about 0 to 25° C.), and which melt down quickly in the mouth to release flavour without imparting a "waxy" mouth feel. This is therein fulfilled by products comprising 10 to 30 wt % of a dispersed fat phase; a continuous aqueous phase comprising an emulsion stabiliser and an emulsifier system comprising both lipophilic and hydrophilic emulsifiers. The products disclosed in said document comprise regions of clustered fat droplets.

It has been found that products according to U.S. Pat. No. 4,273,795 do not easily melt in the mouth. This is believed to be caused by the high stability of the product. Moreover the stabiliser present in the aqueous phase provides a "thick" aqueous phase which may negatively influence the mouth feel of these products. The spattering behaviour of the disclosed products is expected to be unsatisfactory. Moreover according to some embodiments starches and/or proteins are present to provide product firmness. In the disclosed amounts residue formation is considered to take place, which is often not desired.

Furthermore EP 483,896 discloses spoonable non dairy creams comprising emulsifiers such as Tween (polyoxyethylene sorbitan fatty acid esters) and preferably 1 to 10 wt % of a milk protein source.

These products are considered soft products wherein fat globules are present in a "clustered" state. If clustered, the fat globules are in mutual contact via shared adsorbed emulsifier (casein micelles) which is present on the surfaces of both fat globules. Due to the relatively high emulsifier contents that are taught, the resulting products are considered to be stable, which negatively influences the mouth feel of these products upon consumption; the structure does not easily break up at increased temperature and therefore flavour release is believed to be relatively slow for these products.

Moreover the preferred presence of for example 7 wt % protein, will lead to undesired residue formation in frying applications.

Furthermore U.S. Pat No. 4,443,487 discloses a spreadable emulsion, which is at least partially inverted due to specific processing conditions. It has been found that these products invert upon heating, whereby a water in oil emulsion results. Such emulsions have been found to show undesired spattering and are therefore considered less suitable for frying applications.

Matsumura, Y. et al (Bioscience, biotechnology and biochemistry, vol 59, no 9, 1995, pages 1688–1693) disclose an oil in water emulsion comprising palmkernel oil and canauba wax, wherein the oil phase is present in the form of aggregated oil droplets. The high melting canauba wax may have a detrimental effect on mouthfeel. Upon heating this emulsion to 25° C., a creaming layer formed on top of it. This implies the product is not ambient stable.

None of the cited documents discloses a spreadable food product of sufficient hardness, that is suitable for use in shallow frying and as a "spread" in cold use, and preferably also is ambient stable.

It has now been found that the above indicated objectives can be obtained by a food product comprising an oil phase and an aqueous phase and a hydrophilic emulsifier whereby the oil phase is present as a clumped fat phase.

Accordingly the invention relates to a food product comprising from 20 to 80 wt % of a fatty phase, said fatty phase comprising a fat having a solid fat profile of more than 30% solid fat at 5° C. and more than 25% solid fat at 20° C., and wherein the food product comprises one or more hydrophilic emulsifiers and whereby said food product is bicontinuous and further characterised by a clumped fat network and a Stevens hardness value at 5° C. of from 50 to 500 g.

In a second aspect the invention relates to a process for the preparation of such a food product.

DETAILED DESCRIPTION OF THE INVENTION

The current invention provides food products that are suitable for cold use and for use in frying applications.

Suitable food products show a Stevens hardness value at 5° C. of from 50 to 500 g, which implies that these products show sufficient firmness to be able to take or cut a part from them. This firmness is for example comparable to the firmness of products like margarine.

This firmness is obtained by a combination of a fatty phase comprising a fat having a solid fat profile of more than 30% solid fat at SIC and more than 25% solid fat at 20° C. and a hydrophilic emulsifier, whereby the fat phase is present as a "clumped" fat phase.

Products according to the invention have a so called "clumped" fat phase. Clumping is a type of emulsion aggregation characterised by the partial coalescence of neighbouring fat globules. A pre-requisite for clumping is a minimum amount of solid fat which is believed to aid the partial coalescence of touching droplets. In these products, clumped fat globules have thus aggregated to form a continuous network throughout the product that provides sufficient mechanical firmness to enable spreading, spooning and/or packaging of said product. This network can be made visible by microscopy whereby the interconnected clumped fat structures are clearly visible.

Figure 1A:
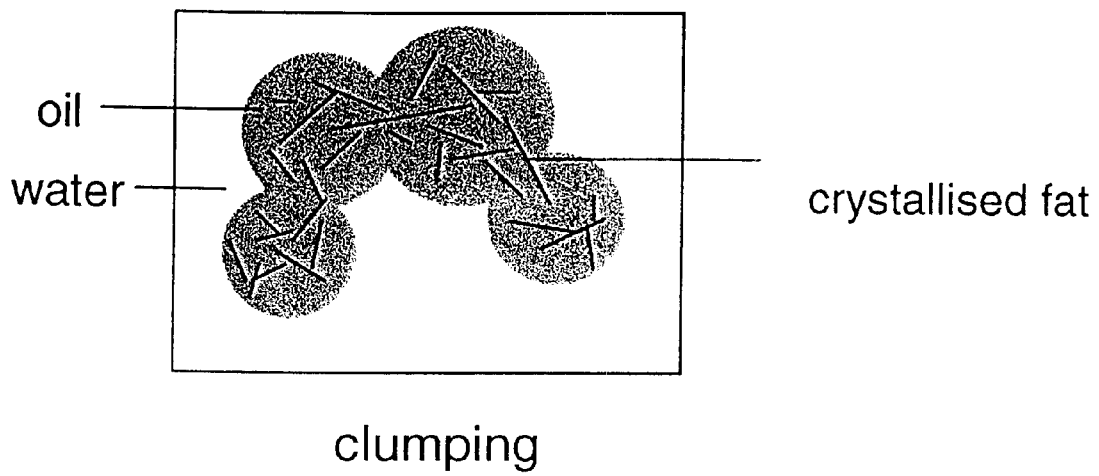
FIG. 1a shows a clumped fat phase.

Examples of a clumped fat phase are shown in FIG. 1a. In FIG. 1a an element of a clumped network is shown. In the product it is believed that the network extends further in all directions (not shown) in a similar manner as shown for the local region of clumped fat globules in FIG. 1a.

Products according to the invention are considered bicontinuous as the continuous aqueous phase is present and intimately dispersed through the existing clumped fat globule network.

This structure is therefore considered to be technically different from a clustered network (FIG. 1b) in that clustered fat globules are still physically separated from each other by an adsorbed layer of emulsifier (primarily casein micelles). Conversely in products according to the invention, the neighbouring fat globule membranes are disrupted, or ruptured at one or more places. At these points of rupture, fat globules become mutually connected or partially coalesced to form a network.

Figure 1B:
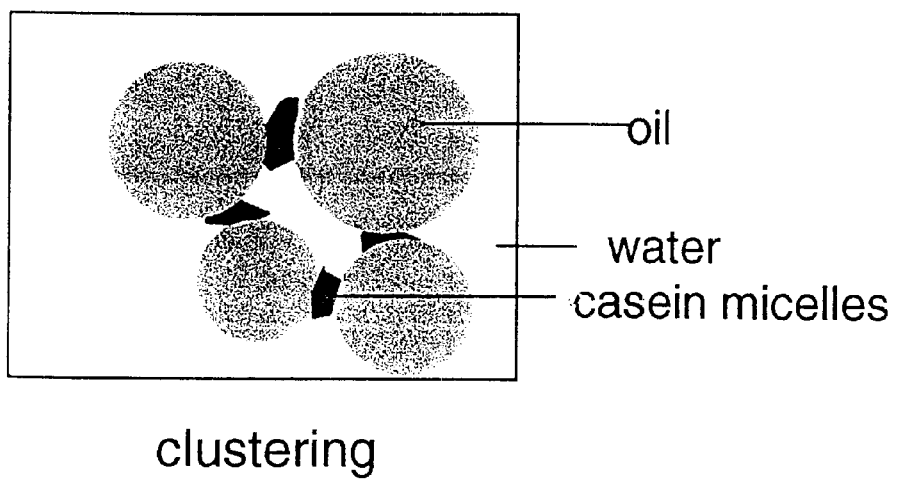
FIG. 1b shows clustered fat globules.

Examples of a clustered network are shown in FIG. 1b.

Moreover clustering can be made with or without solid fat present, whereas clumping has solid fat needed as a prerequisite. Yet another difference may be found in the behaviour of the systems when heated. If heating is applied to a clustered system, the shared casein layer will withstand the tendency of the fat globules to aggregate further, minimising the loss of hardness. However, if a clumped system is subjected to heating, there is nothing to restrain the partially coalesced droplets from fully coalescing resulting in a further softening of product rheology.

For the same given fat blend and homogenisation conditions, it is generally recognised that clumped systems are harder than their clustered counterparts but this is not a fixed rule.

Products according to the invention comprise a hydrophilic emulsifier, which is believed to partition itself into an adsorbed fraction on the fat globule interface and an unadsorbed fraction which remains in the continuous water phase to establish thermodynamic equilibrium after the emulsification process.

The adsorbed emulsifier fraction takes part in the structure formation and stabilisation of the o/w emulsion and is thus believed to be located at the o/w interface, whilst the unadsorbed fraction is not believed to play a functional role but may be present in products according to the invention.

The hydropilic emulsifier is preferably chosen from compounds having an HLB value between 10 and 20, such as sucrose fatty acid esters, Tween, (polyoxyethylene sorbitan mono ester of fatty acid), polyglycerol ester of fatty acid, sodium stearoyl lactylate and combinations thereof. Tween 60, Tween 80 or combinations thereof are considered the most preferred emulsifiers.

It will be appreciated that the emulsifier is preferably food grade. Therefore emulsifiers like SDS are considered less suitable.

It has been found that the amount of emulsifier is important in relation to the mouth feel and physical stability of the food product. Preferably the amount of adsorbed emulsifier is from 0.01 to 0.8 wt %, more preferred from 0.01 to 0.6 wt %, most preferred from 0.05 to 0.4 wt % on total product weight. Adsorbed emulsifier levels of above 0.8 wt % are believed to lead to oil in water emulsions that do not show the desired mouthfeel and frying characteristics, either because these emulsions are stable (not clumped) or do not show a suitable clumped fat phase for such applications.

Other additional (unadsorbed) emulsifiers may be present in addition to the adsorbed emulsifier (present up to 0.8 wt %). These are preferably post added after the emulsification process. Reference is made to the process description below.

The total amount of emulsifier is preferably from 0.01 to 8 wt %.

Products according to the invention, which comprise a clumped fat phase, show reduced spattering in shallow frying, when compared to well known frying products which usually comprise a dispersed aqueous phase in a continuous fat phase.

Spattering can be measured by determining the spattering value according to the method illustrated in the examples. Preferably food products according to the invention show a primary spattering value (spattering upon heating of a frying product such as margarine, without incorporation of a food product to be fried) of from 5 to 10, preferably from 7 to 10.

Food products according to the invention are characterised by a fat content of from 20 to 80 wt %. Preferably said food products comprise from 30 to 65 wt % fat. The invention is especially suitable for products comprising a reduced fat level of from 35 to 55 wt % fat and increased amounts of water as especially these products suffer the drawbacks of reduced firmness if they are water continuous; and undesired spattering of a dispersed aqueous phase if they are fat continuous.

The fat phase of products according to the invention serves to contribute to firmness of the product and to obtain a spreadable consistency. It will be appreciated that the selection of the fat blend influences product properties like firmness and stability. In particular, the solid fat content of the fat blend is important. It has been found that generally the higher the solids content of the fat blend is at a specified temperature, the firmer the product will be.

Therefore a suitable fat phase comprises a relatively high solids content at a given temperature. Solids crystallisation is believed to lead to the formation of fat crystals that may serve as a bridge between fat globules, thereby forming the desired "clumped" fat phase.

A suitable fat blend comprises a fat having the following fat profile: more than 30% at 5° C. and more than 25% at 20° C.

More preferred at least 50 wt %, even more preferred from 75 to 100 wt % of the total fat blend shows the indicated solid fat profile.

The solid fat content can be measured by a suitable analytical method such as NMR.

Even more preferred at least 50 wt % of the total fat is solid at 10° C. Suitable fats in this respect are for example hardened palm kernel oil, coconut fat, hardened coconut fat, (hardened) palm oil, butter fat, fats comprising C14 and/or C16 fatty acids such as laurics, (hardened) babassu oil or mixtures thereof.

Fats comprising a high content of C14 and/or C16 fatty acids are highly preferred as a source of the fat phase, as they tend to show enhanced clumping behaviour and good oral melt properties.

It will be appreciated that a suitable fat blend is preferably of such fat composition that the final product still melts at least partly when consumed.

Especially suitable is a fat blend comprising more than 50% of a partially hardened palm kernel oil, for example a palm kernel oil with a slip melting point of from 35 to 45° C.

Preferably products according to the invention are also stable (i.e. showing no or a least reduced syneresis) at temperatures from ambient temperature (25° C.) and above, up to around 50° C.

It has been found that products with good ambient stability preferably comprise a fat blend wherein at least 25 wt % of the fat, more preferably 30–100 wt % of the fat is selected from the group of palm oil with a slip melting point of 58° C., and rapeseed oil with a slip melting point of 70° C., or other fats showing similar melting behaviour.

In addition to fats fulfilling the above-indicated solid content profile, other fats may be present. These may for example be selected from sunflower oil, palm oil, fish oil, shea oil, soya bean oil, rapeseed oil.

Preferably the fat blend is composed such that the mouthfeel and melting behaviour of the product when consumed are still fine. For example very high melting compounds which could give rise to a product which is very robust and does not melt in the mouth are avoided. Hence for preferred products the fat blend does not contain canauba wax.

Preferably food products according to the invention are free of lipophilic emulsifiers, such as distilled mono- or di-glyceride or their fatty acid esters, other than lecithin, which is believed to lend an improvement in anti-spattering.

These lipophilic emulsifiers are believed to impart undesired characteristics to products, since the presence of relatively high amounts of for example 0.2 wt % of ADMUL Wol (polyglycerol polyricinoleate) leads to fat continuous products. These products do not show the desired spattering behaviour upon use in shallow frying.

It will be appreciated that the level of lipophilic emulsifiers giving rise to a fat continuous product depends on processing conditions and other factors such as fat level, and type.

Optionally an oil phase thickener is present to increase the oil phase viscosity, for example via a gelling mechanism and/or a thickening mechanism.

It is considered advantageous if the selected oil phase thickener leads to an apparent decrease of the rate of melting of the fatty phase of the food product. It is believed that a decreased rate of melting of the fatty phase results in delayed melting of the product structure in frying applications. Due to this delayed melting the formation of a separate oil layer on top of a separate aqueous phase layer is retarded or prevented, for sufficient time as to allow the aqueous phase to evaporate. It has been found that immediate formation of an oil layer on top of an aqueous phase often results in undesired spattering caused by explosive evaporation of the trapped aqueous phase.

Preferred oil phase thickeners are for example hydroxystearic acid, carboxymethylcellulose, alkyd polyester polymers or natural polymers such as cutin. Preferred amounts of oil phase thickener are from 0.01 to 7 wt %, more preferred from 1 to 5 wt %, most preferred from 3 to 5 wt % on total product weight.

Hydroxystearic acid (HSA) is highly preferred as oil phase thickener. It has been found that HSA may decrease the rate of melting of an oil phase. It will be appreciated that the decrease in rate of melting varies depending on the amount of oil phase thickener that is added.

Products according to the invention can be of any pH. Preferred is a pH of from 4 to 7, more preferred from 4.3 to 5.8, most preferred from 4.8 to 5.8. A pH of between 4.3 and 5.8 is preferred as it may contribute to microbiological stability of the product.

Optionally products according to the invention may comprise some protein. However care should be taken that the amount of protein is low, preferably up to 3 wt % more preferably up to 2 wt % on total product weight, more preferred below 1 wt % on total product weight. It has been found that higher protein levels result in an undesirable increased stability of an oil in water emulsion, thereby preventing the formation of a clumped fat network. Moreover increased protein levels may lead to the formation of residue in shallow frying applications, which is often considered undesired.

Protein if present, may originate from any source. Examples of suitable protein sources are dairy products like milk, cream, whey, skim milk (powder), buttermilk, buttermilk powder, egg, and plant sources like soy beans, and pea. Examples of suitable proteins are, whey protein, casein, soy bean protein, skim milk powder, egg white protein, egg yolk protein. Preferably the protein is of dairy origin, because of its positive contribution to taste and flavour of food products.

To further improve spattering behaviour of products according to the invention, generally known anti-spattering agents may be added to said food products. For example lecithin and salt are well known anti-spattering agents. Lecithin is preferably present in an amount of from 0.2 to 0.4 wt % and salt is preferably added in an amount of from 0.1 to 2 wt %, preferably 0.2 to 1.5 wt %. The preferred salt is sodium chloride.

In addition to the above-mentioned ingredients, food products according to the invention may optionally contain further ingredients suitable for use in these products. Examples of these materials are sugar or other sweetener materials, EDTA, spices, salt, bulking agents, egg yolk, emulsifiers, stabilising agents, flavouring materials, colouring materials, acids, preserving agents, and fruit and/or vegetable particles.

In a second aspect the invention relates to a process to prepare the food product according to the invention. Any suitable process may be used to prepare these products. Preferred processes include an emulsification, homogenisation, heating and cooling step.

An especially suitable process comprises the following steps
 a) an emulsion comprising an oil phase, an aqueous phase and a hydrophilic emulsifier, is subjected to homogenisation at a pressure of from 50 to 400 bar at a preferred temperature of from 30 to 70° C.

b) the resulting mixture is cooled to a temperature below 10° C. at a cooling rate of from 0.2 to 50° C./min.

The emulsion in step (a) can be prepared in any way. For example a mixture of oil phase ingredients is prepared at a temperature of from 30 to 70° C., more preferred from 40 to 65.

The oil phase is emulsified into the aqueous phase. This emulsification can for example be obtained by stirring or a homogenisation treatment. Preferably the hydrophilic emulsifier is added to the aqueous phase prior to emulsification of the oil phase in the aqueous phase. The resulting emulsion in step (a) forms the basis of the clumped fat phase structure. Therefore it is preferred to control the emulsification such that a homogeneous emulsion is formed. A homogeneous emulsion in the context of the invention is an emulsion wherein the fat phase is evenly distributed in the aqueous phase whereby the formation of large aggregates of fat globules is avoided immediately after emulsification. It will be appreciated that fat aggregation after emulsification in the form of clumping, is of course necessary in the invention.

The amount of hydrophilic emulsifier added before homogenisation is preferably at most 0.8 wt %. We have found that, if a higher total amount of hydrophilic emulsifier is desired in the final product, this is possible, but then preferably the additional amount of emulsifier, thus greater than 0.8 wt %, is added after the homogenisation treatment. The majority of the hydrophilic emulsifier added before homogenisation is believed to take part in structure formation of an o/w emulsion, and is believed to be present at the o/w interface.

The hydrophilic emulsifier added before homogenisation has above been referred to as "adsorbed" emulsifier and the optional hydrophilic emulsifier added after homogenisation has above been referred to as "unadsorbed" emulsifier.

The oil phase may comprise ingredients like oil, oil soluble compounds like colourants or flavours, stabilising agents, sweetener, antioxidants, oil phase thickener and lipophilic emulsifier.

The aqueous phase may comprise water, water-soluble compounds like flavours, colourants, antioxidants and the like. These may all be added at any stage during the process. Addition of these ingredients either to the aqueous phase before mixing with the oil phase or after homogenisation are two preferred stages.

Preferably protein if added to the products according to the invention, is added after homogenisation. Addition of protein before homogenisation was found in many cases not to lead to a clumped fat phase.

The emulsion in (a) is subjected to a homogenisation treatment. Preferably said homogenisation is started after the emulsion has been heated to a temperature of from 30 to 70° C.

According to another embodiment, the aqueous phase and the oil phase are separately heated to a temperature of from 30 to 70° C. and thereafter emulsified. The resulting emulsion may then be used as such or its temperature may be further adjusted.

The homogenisation is preferably carried out at a temperature from 30 to 70° C., more preferred from 40 to 60° C.

The homogenisation treatment is believed to be one of the factors influencing the formation of the desired "clumped" fat phase structure. Therefore care should be taken that homogenisation is not at too high a pressure, as then very small droplets (which may rapidly re-coalesce) may result which is not desirable. On the other hand too low a pressure (very large droplets) is believed to be undesirable in obtaining a sufficiently firm product. Therefore homogenisation is carried out at a pressure of from 50 to 400 bar, preferably from 50 to 300 bar, more preferred from 75 to 200 bar.

The homogenisation treatment preferably lasts from 1 to 10 minutes, more preferred from 3 to 5 minutes. It will be appreciated that the duration of a homogenisation treatment may also be expressed as number of passes. About 1–10 passes were found to be suitable, with a preference for 4–7 passes.

Preferably the homogenisation conditions are chosen such that the resulting individual emulsion droplets before clumping show an average diameter $D_{3,2}$ size (as measured by a suitable method such as laser diffraction e.g. Malvern Instruments Mastersizer) of less than 3 µm, more preferred less than 2 µm. The lower limit of the $D_{3,2}$ is determined by technical limitations and is generally around 0.2 to 0.3 µm. Furthermore after homogenisation, the fat droplet size distribution in the emulsion is preferably such that 90 vol % of the droplets show a mean average diameter of less than 20 µm, more preferred less than 10 µm.

It is believed to be within the capability of the skilled person to vary the homogenisation pressure within the indicated range in such a way that the preferred droplet diameter distributions are obtained. It has been found that increased homogenisation pressure may lead to a reduced average fat droplet diameter, while reduced homogenisation pressures may lead to an increase in the average fat droplet diameter.

After homogenisation, in step (b) the product is cooled to a temperature below 10 preferably below 7° C., more preferred below 6° C., most preferred below 5° C. Preferably the temperature is such that the product does not freeze, i.e. generally a suitable temperature is above −4° C., more preferred above 0° C.

The cooling step is preferably carried out at a rate of from 0.2 to 50° C. per minute. It has been found that extremely fast cooling rates, in the order of from 10 to 50° C. per minute lead to products with desired firmness and clumped fat phase structure.

Products may be cooled as in step (b) in line or after filling in a package such as a tub.

Preferably after cooling the product is maintained at below 10° C. for a time period of from 5 hours to 5 days. It has been found that time periods of from 12 to 72 hours are sufficient to obtain spreadable products with the desired firmness.

Therefore we have found a highly efficient process, whereby short storage times (up to 5 days) lead to the final product structure of a "clumped fat phase". Optionally after cooling the products are subjected to temperature cycling. It has been found that temperature cycling may serve to increase the product firmness. Suitable temperature cycling regimes are for example increasing the temperature to 10–20° C. for a time between 1 and 24 hours, followed by cooling to 0 to 5° C. and maintenance at this temperature for at least 1 hour. This temperature cycling may be repeated several times.

Optionally further ingredients like pieces of fruit or vegetable particles can be added just before, during, or just after the homogenisation treatment. It is highly preferred that such ingredients are not added after cooling as the required mixing may then disturb the formation of the desired product structure.

EXAMPLES

Measurement of Stevens Hardness Value

A probe diameter of 4 mm, probe speed of 2 mm s$^{-1}$ and a penetration depth of 10 mm were used on a Stevens LFRA texture analyser to determine the hardness of a product that has been stored at 5° C. The hardness was the peak value taken from the measurement. The hardness is expressed in g.

Measurement of Spattering Value

The spattering behaviour of food products according to the invention was evaluated after storage of the products for 1 or 8 days at 5° C.

Primary spattering (PS) was assessed under standardised conditions in which an aliquot of a food product was heated in a glass dish and the amount of fat spattered onto a sheet of paper held at a fixed distance above the dish was assessed after the water content of the food product had been driven off by heating.

In assessment of the primary spattering value about 25 g food product was heated in a glass dish on an electric plate to about 205° C. The fat that spattered out of the pan by force of expanding evaporating water droplets was deposited on a sheet of paper situated above the pan. The image obtained was compared with a set of standard pictures number 0–10 whereby the number of the picture which most closely resembled the product was recorded as the spattering value for that product. A value of 10 indicates no spattering (no fat loss) and zero indicates very bad spattering (almost total fat loss). The general indication is as follows.

| Score | Comments |
|---|---|
| 10 | Excellent |
| 8 | Good |
| 5 | Acceptable |
| 4 | Unsatisfactory |
| 2 | Very Poor |

Example 1

A fat phase consisting of palm kernel oil with a slip melting point of 38° C. was heated to 60° C. Separately an aqueous phase comprising potassium sorbate and Tween (ICI) (obtained from Sigma) was heated to 60° C. The two phases were premixed in a Silverson blender™ for 5 minutes.

The resulting emulsion was homogenised at a pressure of 150 bar for 5 passes using a Crepaco homogeniser to a $D_{32}$ of about 1.3 μm The product was filled into tubs and allowed to cool to 5° C. at a rate of about 1° C. per minute.

The resulting spread (2 kg product) comprised 40 wt % Palm kernel oil with slip melting point of 38° C., 0.2 wt % potassium sorbate 0.4 wt % Tween 60 (ICI) and 59.4 wt % water. The fat blend showed the following solid fat profile: N20—82%, N30—25%, N35—7%, N40—3%.

The pH of the spread was 7.

The resulting product was very well spreadable and showed a Stevens value hardness of 155 g at 5° C.

The primary spattering value for this product was: 5 The product when used in shallow frying, did not result in significant sediment formation. Product structure was evaluated by CSLM microscopy and EM freeze-fracture microscopy. The picture clearly showed a bridged/clumped fat structure.

The product showed good melting (contrary to a clustered system) and flavour release upon consumption.

Comparative Example C1

(according to U.S. Pat. No. 4,443,487).

An oil in water emulsion was prepared starting from the following composition: 40 wt % hardened palm kernel oil with slip melting point of 38° C., 1 wt % Tween (polyoxyethylene sorbitan monostearate), sodium chloride 0.2 wt % and water up to 100 wt %.

The emulsion was subjected to high pressure homogenisation at 200 psi to achieve dispersion of the fat droplets of less than 3 microns. The emulsion was cooled to 10° C. and allowed to stand overnight. The emulsion was then poured into a container, warmed up to 25° C., and then cooled to 10° C.

The resulting product was merely pourable and could not be called a spread as desired in the context of the invention.

Comparative Example C2

The procedure of example C1 was repeated with the exception that the product was cooled to 5° C. and not temperature cycled.

The Stevens value of this product was 328 g at 5° C. The primary spattering value for this product was 1.

Example 2

The procedure of example 1 was repeated except that lecithin was added in an amount of 0.08 wt % (on total product) to the oil phase. Salt was added to the aqueous phase in an amount of 1.2 wt % on product. The balance to 100% was made up with water. The primary spattering value was 5.5.

Stevens value at 5° C. was 93 g.

Example 3

The procedure of example 1 was repeated accept that lecithin (0.08 wt %) and hydroxystearic acid (2 wt % on product) was added to the aqueous phase in an amount of 1.2 wt % on product. The balance was made up with water.

The product showed a Stevens hardness value at 5° C. of 316 g and a primary spattering value of 7.

Example 4

A fat phase comprising Palm oil with a slip melting point of 58° C. (PO58) (12 wt % on product) and sunflower oil (28 wt % on product) was prepared.

An aqueous phase comprising Tween 60 (0.4 wt % on product) MAFSK-380 (flavour) (0.015 wt % on product), water soluble beta-carotene (0.08 wt % on product), salt (1 wt % on product) and water (58.505 wt % on product) was prepared.

The aqueous phase and fat phases were heated separately to 70° C. A premix of the fat phase and the aqueous phase was made in a Silverson blender for 5 mins. This premix was homogenised at 150 bar for 5 passes ($D_{3,2}$ ca. 1.3 μm). The resulting mixture was filled into tubs and allowed to cool to ambient temperature (ca. 22° C.) at ca. 1° C./min. The emulsion was then temperature cycled to 45° C. and cooled back to ambient temperature. Spreads had not phase separated and still had good spreadability and flavour release after the temperature cycle to 45° C. Only a small amount of free water was observed in the tub. Stevens hardness value at 5° C. was 93 g.

Example 5

A fat phase comprising Palm Oil with a slip melting point of 58° C. (12 wt % on product) and sunflower oil (28 wt % on product) was prepared.

An aqueous phase comprising Tween 60 (0.4 wt % on product) MAFSK-380 (flavour) (0.015 wt % on product), water soluble beta-carotene (0.08 wt % on product), salt (1 wt % on product), SA2 (maltodextrin) (5.4 wt % on product) water (53.105 wt % on product) was prepared.

The aqueous phase was heated to 90° C. to disperse the SA2, and cooled to 70° C. The fat phase was heated to 70° C. A premix comprising the fat phase and the aqueous phase was prepared in a Silverson blender for 5 mins. The resulting mixture was homogenised at 150 bar for 5 passes ($D_{3,2}$ ca. 1.3 μm). The product was filled into tubs and allowed to cool to ambient temperature (ca. 22° C.) at ca. 1° C./min. The emulsion was then temperature cycled to 45° C. and cooled back to ambient temperature. The products had not phase separated and still had good spreadability and flavour release after the temperature cycle to 45° C. The presence of SA2 is believed to further reduce free water and syneresis. The Stevens hardness value at 5° C. was 102 g.

What is claimed is:

1. Food product comprising from 20 to 80 wt % of a fatty phase, said fatty phase comprising a fat having a solid fat profile of more than 30% solid fat at 5° C. and more than 25% solid fat at 20° C. and wherein the food product comprises one or more hydrophilic emulsifiers, wherein said food product is bicontinuous and has a clumped fat network and a Stevens hardness value at 5° C. of from 50 to 500 g.

2. Food Product according to claim 1, characterised in that the hydrophilic emulsifier is selected from the group consisting of emulsifiers with an HLB value of between 10–20.

3. The food product according to claim 2 wherein the emulsifiers are selected from the group consisting of sucrose fatty acid esters, Tween (polyoxyethylene sorbitan mono ester of fatty acid), polyglycerol ester of fatty acid, sodium stearoyl lactylate and combinations thereof.

4. Food product according to claim 1, characterised in that the total amount of hydrophilic emulsifier is from 0.01 to 0.8 wt %.

5. Food product according to claim 4, characterised in that the hydrophilic emulsifier is adsorbed hydrophilic emulsifier.

6. Food product according to claim 1, characterised in that said food product comprises an oil phase thickener.

7. Food product according to claim 6, characterised in that the amount of oil phase thickener is from 0.01 to 7 wt %.

8. Food product according to claim 1, characterised in that said food product comprises protein in an amount from 0 to 3 wt %.

9. Food product according to claim 1 characterised in that said food product is free of lipophilic emulsifier, other than lecithin.

10. Process for the production of a food product according to claim 1, comprising the following steps:
   a) subjecting an emulsion comprising an oil phase, an aqueous phase and a hydrophilic emulsifier, to homogenisation at a pressure of from 50 to 400 bar; and
   b) cooling the resultin mixture to a temperature below 10° C. at a cooling rate of from 0.2 to 50° C./min.

11. Process according to claim 10, wherein homogenisation in step (a) results in fat globules with an average diameter $D_{3,2}$ size below 3 μm.

12. Process according to claim 10, wherein said homogenisation is carried out at a pressure of from 50 to 300 bar.

13. Process according to claim 10, wherein cooling in step (b)is carried out at a rate of from 10 to 50° C. per minute.

14. Process according to claim 10, wherein after step (b) said mixture is subjected to temperature cycling.

15. Product obtained by the process according to claim 10.

16. Process of using the product produced according to claim 10 comprising frying a foodstuff in the product.

17. Process of using the product according to claim 1, comprising frying a foodstuff in the product.

* * * * *